US012033515B2

(12) United States Patent
T et al.

(10) Patent No.: US 12,033,515 B2
(45) Date of Patent: Jul. 9, 2024

(54) SYSTEM AND METHOD FOR TRANSMITTING REPORTS FROM AUTOLAND ACTIVATED AIRCRAFT

(71) Applicant: HONEYWELL INTERNATIONAL INC., Charlotte, NC (US)

(72) Inventors: Prem Kumar T, Bangalore (IN); Karthic V, Bangalore (IN); Kalaiarasu Velappan, Bangalore (IN); Gireesh Kumar R N, Bangalore (IN); Mohammed Ibrahim Mohideen, Bangalore (IN); Janakiram Thiyagarajan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 29 days.

(21) Appl. No.: 17/815,295

(22) Filed: Jul. 27, 2022

(65) Prior Publication Data

US 2023/0401962 A1 Dec. 14, 2023

(30) Foreign Application Priority Data

Jun. 9, 2022 (IN) ............................ 202211033015

(51) Int. Cl.
*G08G 5/00* (2006.01)
*G08G 5/02* (2006.01)
*G08G 5/04* (2006.01)

(52) U.S. Cl.
CPC ......... *G08G 5/0008* (2013.01); *G08G 5/0021* (2013.01); *G08G 5/0078* (2013.01);
(Continued)

(58) Field of Classification Search
CPC .. G08G 5/0008; G08G 5/0021; G08G 5/0078; G08G 5/0091; G08G 5/025; G08G 5/045
See application file for complete search history.

(56) References Cited

U.S. PATENT DOCUMENTS 9,199,724 B2 * 12/2015 Pastor .................. G05D 1/0688
9,208,687 B2 * 12/2015 Wang ................... G08G 5/0008
(Continued)

FOREIGN PATENT DOCUMENTS

CA 2848088 C 9/2017

*Primary Examiner* — Curtis A Kuntz
*Assistant Examiner* — James E Munion
(74) *Attorney, Agent, or Firm* — Lorenz & Kopf LLP

(57) ABSTRACT

A system and method of transmitting an aircraft report (AIREP) from a first aircraft having an enabled aircraft autoland system includes retrieving, via a first processing system, standard AIREP data from one or more avionic systems within the first aircraft, the standard AIREP data including standard AIREP reporting information. The first processing system retrieves autoland enablement data that indicates whether the autoland system was manually or automatically enabled, and also retrieves autoland information data from the one or more avionics systems, where the autoland information data includes current aircraft state data and current flight plan data and is different from the standard AIREP data. The autoland information data is appended to the standard AIREP data to generate an AIREP-autoland message and the AIREP-autoland message is transmitted.

17 Claims, 5 Drawing Sheets

(52) U.S. Cl.
CPC ........... *G08G 5/0091* (2013.01); *G08G 5/025* (2013.01); *G08G 5/045* (2013.01)

(56) References Cited

U.S. PATENT DOCUMENTS

| | | | | |
|---|---|---|---|---|
| 9,310,222 | B1 | 4/2016 | Suiter et al. | |
| 10,543,931 | B2 * | 1/2020 | Saptharishi | G08G 5/0013 |
| 10,620,641 | B2 | 4/2020 | Haskins et al. | |
| 10,816,970 | B2 | 10/2020 | Bosworth et al. | |
| 2011/0121998 | A1 | 5/2011 | Glover | |
| 2013/0120166 | A1 | 5/2013 | Kommuri et al. | |
| 2013/0297102 | A1 * | 11/2013 | Hughes | G05D 1/0083 701/3 |
| 2014/0316617 | A1 * | 10/2014 | Ali | G05D 1/0676 701/16 |
| 2015/0007080 | A1 * | 1/2015 | Nama | G01C 23/00 715/771 |
| 2016/0057032 | A1 * | 2/2016 | Tieftrunk | G08G 5/0026 709/224 |
| 2017/0249852 | A1 * | 8/2017 | Haskins | G08G 5/0086 |

* cited by examiner

SYSTEM AND METHOD FOR TRANSMITTING REPORTS FROM AUTOLAND ACTIVATED AIRCRAFT

CROSS-REFERENCE TO RELATED APPLICATION

This application claims priority to India Provisional Patent Application No. 202211033015, filed Jun. 9, 2022, the entire content of which is incorporated by reference herein.

TECHNICAL FIELD

The present invention generally relates to systems and methods for transmitting reports from an aircraft, and more particularly relates to systems and methods for transmitting reports from an autoland activated aircraft.

BACKGROUND

Most commercial aircraft will transmit reports of actual weather conditions encountered by the aircraft while in flight. There are typically two types of reports that get transmitted—an aircraft report (AIREP) and a pilot report (PIREP). An AIREP is a routine, automated report of in-flight weather conditions such as wind and temperature. A PIREP is manually reported by a pilot to indicate encounters of hazardous weather such as icing or turbulence. Both are transmitted in real-time via a transmitter to air traffic control (ATC) and to other aircraft within receiving distance of the transmission.

Many commercial aircraft also include an autoland system. As is generally known, an autoland system can take complete control of, and land, the aircraft in an emergency, such as in the unlikely event the pilot is unable to fly. The autoland system can be enabled automatically or manually. For example, some autoland systems are configured to be automatically enabled when, via a decision algorithm, it is determined that the pilot is unable to fly. Some autoland systems are also configured such that any flight crew member or any alert passenger can manually engage the system by pushing a button in the cockpit. Regardless of how the autoland system is enabled, when it is, the autoland system automatically lands the aircraft without user intervention.

When the autoland system is enabled, it would be desirable to periodically share, for the autoland enabled aircraft, various aircraft status information that could benefit both ATC and other aircraft. This would enable ATC and other aircraft to determine if the autoland enabled aircraft presents, or could potentially present, a conflict with one or more surrounding aircraft. However, at present, such capability is not available.

Hence, there is a need for a system and method to periodically share various aircraft status information of an autoland activated aircraft to ATC and other aircraft. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a system for transmitting an aircraft report (AIREP) from a first aircraft having an enabled aircraft autoland system includes a transmitter and a first processing system. The transmitter is coupled to receive a transmit command and is configured, in response to receiving the transmit command, to selectively transmit one or more messages. The first processing system is in operable communication with the transmitter and is configured to: retrieve standard AIREP data from one or more avionic systems disposed within the first aircraft, where the standard AIREP data including standard AIREP reporting information; retrieve autoland enablement data that indicates whether the autoland system was manually or automatically enabled; retrieve autoland information data from the one or more avionics systems, where the autoland information data includes current aircraft state data and current flight plan data, and is different from the standard AIREP data; append the autoland information data to the standard AIREP data to generate an AIREP-autoland message; supply the AIREP-autoland message to the transmitter; and command the transmitter to transmit the AIREP-autoland message.

In another embodiment, a method of transmitting an aircraft report (AIREP) from a first aircraft having an enabled aircraft autoland system includes retrieving, via a first processing system, standard AIREP data from one or more avionic systems within the first aircraft, the standard AIREP data including standard AIREP reporting information. The first processing system retrieves autoland enablement data that indicates whether the autoland system was manually or automatically enabled, and also retrieves autoland information data from the one or more avionics systems, where the autoland information data includes current aircraft state data and current flight plan data and is different from the standard AIREP data. The autoland information data is appended to the standard AIREP data to generate an AIREP-autoland message and the AIREP-autoland message is transmitted.

In yet another embodiment, a system for communicating an aircraft report (AIREP) from a first aircraft having an enabled aircraft autoland system to a second aircraft includes a transmitter, a first processing system, a receiver, and a second processing system. The transmitter is disposed within the first aircraft and is coupled to receive a transmit command. The transmitter is configured, in response to receiving the transmit command, to selectively transmit one or more messages. The first processing system is disposed within the first aircraft. The first processing system is in operable communication with the transmitter and is configured to: retrieve standard AIREP data from one or more avionic systems disposed within the first aircraft, where the standard AIREP data includes standard AIREP reporting information; retrieve autoland enablement data that indicates whether the autoland system was manually or automatically enabled; retrieve autoland information data from the one or more avionics systems, where the autoland information data includes current aircraft state data and current flight plan data and is different from the standard AIREP data; append the autoland information data to the standard AIREP data to generate an AIREP-autoland message; supply the AIREP-autoland message to the transmitter; and command the transmitter to transmit the AIREP-autoland message. The receiver is disposed within the second aircraft and is configured to receive the AIREP-autoland message transmitted by the first aircraft. The second processing system is disposed within the second aircraft and is in operable communication with the receiver. The second processing system is coupled to receive the AIREP-autoland message from the receiver and is configured to: process the AIREP-autoland message to determine if the first aircraft represents a potential conflict with the second aircraft, and when the first aircraft represents the potential conflict, command a display device to render a warning icon indicating that the potential conflict exists.

Furthermore, other desirable features and characteristics of the system and method for transmitting reports will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
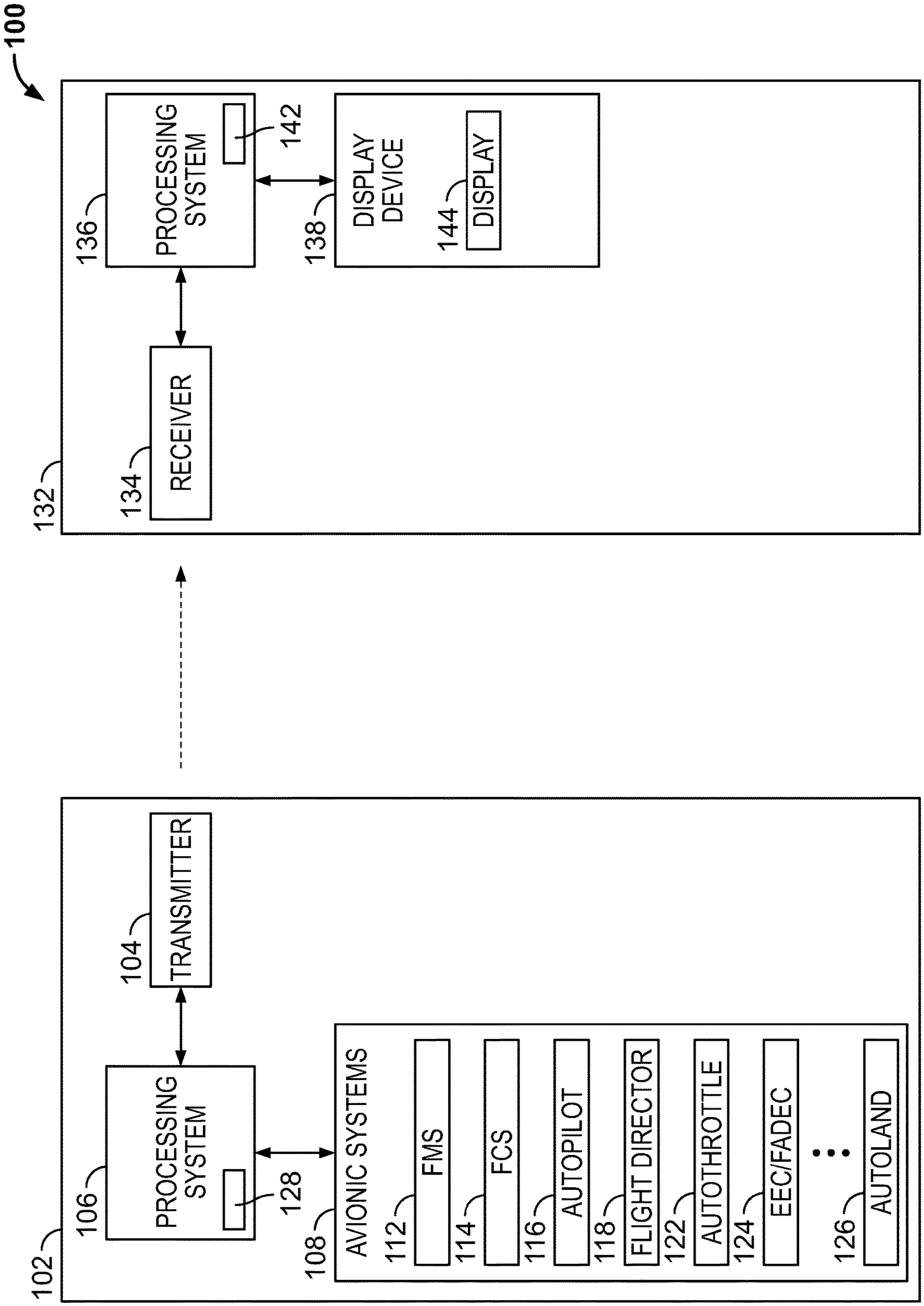
FIG. 1 depicts a functional block diagram of one embodiment of a system for transmitting an aircraft report (AIREP) from a first aircraft.

Referring first to FIG. 1, a functional block diagram of one embodiment of a system 100 for transmitting an aircraft report (AIREP) is depicted and includes, within a first aircraft 102, a transmitter 104, and a first processing system 106. The transmitter 104 is coupled to receive a transmit command and is configured, in response to receiving the transmit command, to selectively transmit one or more messages. The transmitter 104 may be any one of suitable types of radio transmitters that are disposed within aircraft and are configured to transmit various types of messages, such as AIREPs and PIREPs.

The first processing system 106 is in operable communication with the transmitter 104 and is configured to implement various functions. Before discussing these functions, it is seen that the system 100 also includes various avionic systems 108, which are also disposed within the first aircraft 102. These avionic systems 108 may vary but include, at least in the depicted embodiment, a flight management system (FMS) 112, a flight control system (FCS) 114, an autopilot system 116, a flight director 118, an auto throttle system 122, and an engine controller (EEC/FADEC) 124, just to name a few.

As FIG. 1 further depicts, the avionic systems 108 also include an autoland system 126. The autoland system 126 is configured, when enabled, to automatically land the first aircraft 102 without user intervention. The autoland system 126 may be enabled either automatically or manually. For example, the autoland system 126 may be configured to continuously monitor whether a pilot has interacted with the cockpit and to be automatically enabled when the pilot has not interacted with the cockpit for a predetermined amount of time. The autoland system 126 may be manually enabled by, for example, a user (pilot or non-pilot) manipulating a non-illustrated switch or button.

Regardless of how the autoland system 126 becomes enabled, when it is enabled, various ones of the avionic systems 108 (e.g., the flight management system (FMS) 112, the flight control system (FCS) 114, the autopilot system 116, the flight director 118, the auto throttle system 122, the engine controller 124, etc.) and various other non-illustrated subsystems are engaged and controlled to automatically land the first aircraft 102. In addition, the autoland system 126, when enabled, triggers the various functions of first processing system 106 that were mentioned above, and which will now be described.

The functions of the first processing system 106, which are implemented via one or more suitably programmed processors 128, include retrieving standard AIREP data from one or more of the avionic systems 108. As used herein, "standard AIREP data" includes standard AIREP reporting information, as is generally known in the art. The first processing system 106 is additionally configured to retrieve autoland enablement data that indicates whether the autoland system 126 was manually or automatically enabled, and to retrieve autoland information data from the one or more avionics systems 108. It is noted that the autoland information data includes at least current aircraft state data and current flight plan data, and these data are different from the standard AIREP data. For example, the autoland information data may include, without limitation, the destination runway, the current and next flight level, the estimated time of arrival (ETA) to the destination runway, fuel level, and aircraft health status.

The first processing system 106 is additionally configured, upon retrieving the autoland information data, to append the autoland information data to the standard AIREP data, thereby generating an AIREP-autoland message. The first processing system 106 then supplies the AIREP-autoland message to the transmitter 104 and commands the transmitter 104 to transmit the AIREP-autoland message.

One example of an AIREP-autoland message might be:

"AIREP SPECIAL UNITED AIRLINES THREE TWO TWO POSITION FIVE FIVE ZERO THREE NORTH ONE SEVEN ZERO TWO ZERO EAST FLIGHT LEVEL THREE ZERO ZERO DESCENDING TO FLIGHT LEVEL ZERO FOUR ZERO AUTOLAND ACTIVATED—PILOT INCAPACITATION DESTINATION—KPHX 07L FUEL REMAINING 2000 LBS".

When placed in proper AIREP format, the transmitted AIREP-autoland message would be:

ARS UAL322 5503N17020E 0105 F300 DSC F040 AL PI INCAP KPHX 07L FR

As may be appreciated, the autoland information data may change during the landing operation of the first aircraft 102. Thus, the first processing system 106 is configured to continuously retrieve the autoland information data from the one or more avionics systems 108, and to determine if the autoland information data has changed. If the first processing system 106 determines that the autoland information data has changed, it appends the changed autoland data to the standard AIREP data to generate an updated AIREP-autoland message, supplies the updated AIREP-autoland message to the transmitter, and commands the transmitter 104 to transmit the updated AIREP-autoland message.

The AIREP-autoland messages (original and updated) are transmitted for receipt by both ground stations (e.g., air traffic control) and other aircraft. Thus, as FIG. 1 further depicts, the system 100 may additionally include, within at least one second aircraft 132, a receiver 134, a second processing system 136, and a display device 138. The receiver 134 is configured to receive the AIREP-autoland messages transmitted by the transmitter 104 in the first aircraft 102. The receiver 134 may be any one of suitable types of radio receivers that are disposed within aircraft and are configured to receive various types of messages, such as AIREPs and PIREPs.

The second processing system 136 is disposed within the second aircraft 132 and is in operable communication with the receiver 134. The second processing system 136 is coupled to receive the AIREP-autoland messages from the receiver 134 and is configured to implement various functions. These functions, which are implemented via one or more suitably programmed processors 142, include processing the AIREP-autoland messages to determine if the first aircraft 102 represents a potential conflict with the second aircraft 132. A potential conflict may exist when, for example, the flight profiles of the first and second aircraft 102, 132 are in conflict. One specific example of this may be when the first and second aircraft 102, 132 are scheduled to land at the same destination runway within a predetermined period of time. No matter the specific conflict, if or when the first aircraft 102 does represent the potential conflict, the second processing system 136 commands the display device 138 to render one or more images. Before discussing these images, a brief description of the display device 138 will first be provided.

The display device 138 is configured, in response to commands supplied from the second processing system 136, to render the above-mentioned images. To do so, the display device 138 may include any number and type of image generating devices on which one or more avionic displays 144 may be generated. The display device 138 may be fixed or portable. For example, the display device may be affixed to the static structure of the aircraft cockpit as, for example, a Head Down Display (HDD) or Head Up Display (HUD) unit. In some embodiments, the display device 138 may assume the form of a portable device such as a pilot-worn display device, an Electronic Flight Bag (EFB), a laptop, or a tablet computer carried into the aircraft cockpit by a pilot.

As noted above, at least one avionic display 144 is generated on the display device 138 during operation of the system 100. As used herein, the term “avionic display” is synonymous with the term “aircraft-related display” and “cockpit display” and encompasses displays generated in textual, graphical, cartographical, and other formats. The system 100 can simultaneously generate various types of lateral and vertical avionic displays 144 on which various images are displayed.

Figure 2:
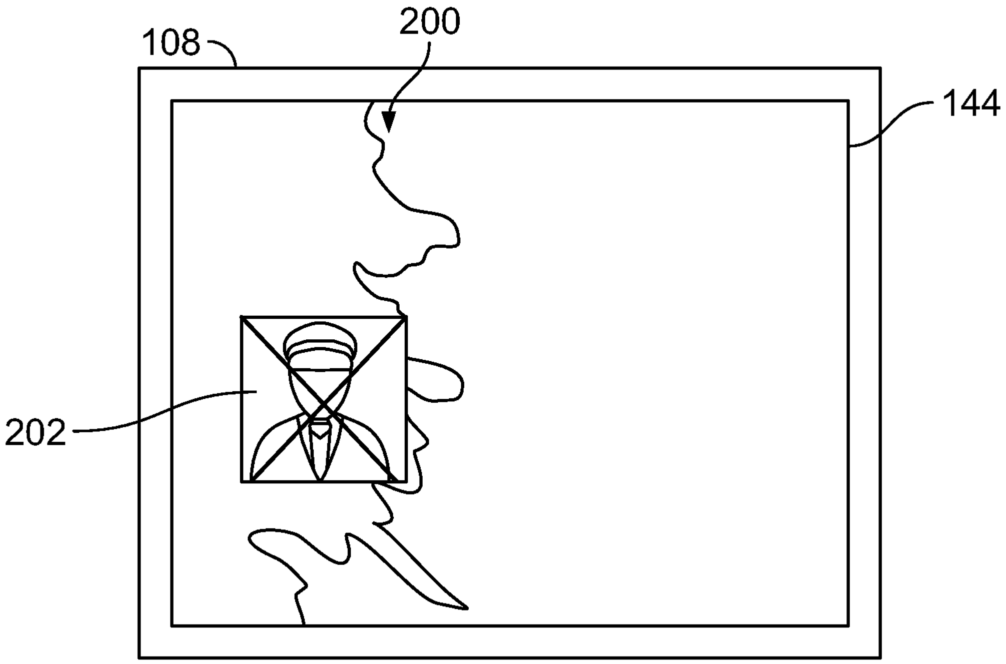
FIGS. 2-5 depicts examples of images that may be rendered on a display device of the system of FIG. 1.

Referring now to FIG. 2, one example of an image 200 that may be rendered on the display 144 when the first aircraft 102 does represent a potential conflict is depicted. As illustrated therein, the image 200 includes a warning icon 202 indicating that the potential conflict exists. Although the depicted warning icon is a pilot with an “X” across it, this is merely one example of a warning icon. It will be appreciated that the warning icon could be any one of numerous graphical or textual icons useful to suitably distinguish and alert to a pilot that a potential conflict with an autoland enabled aircraft exists.

Figure 3:
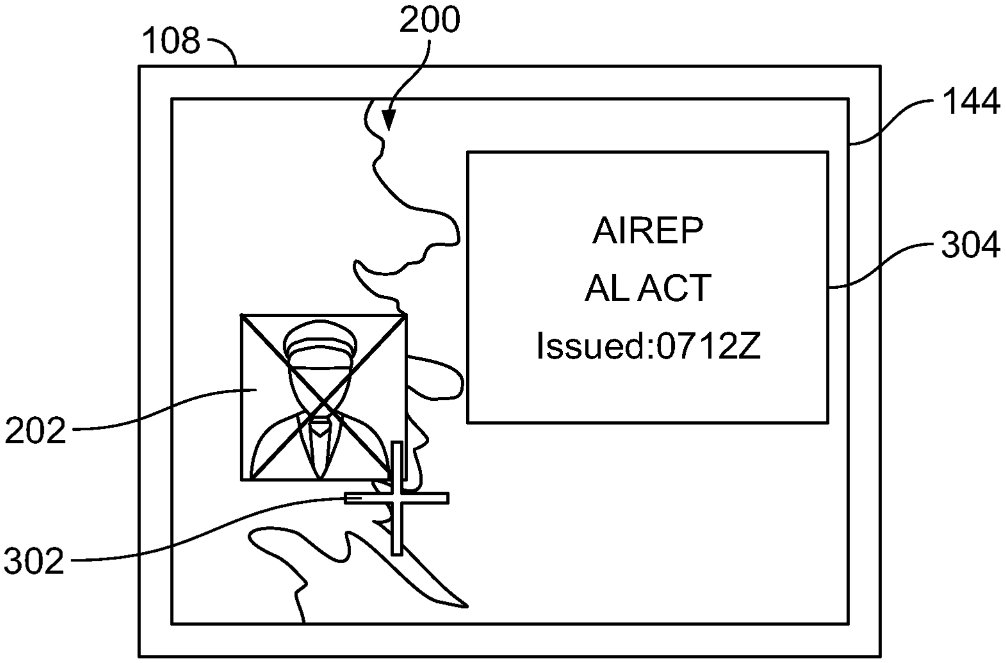
Figure 4:
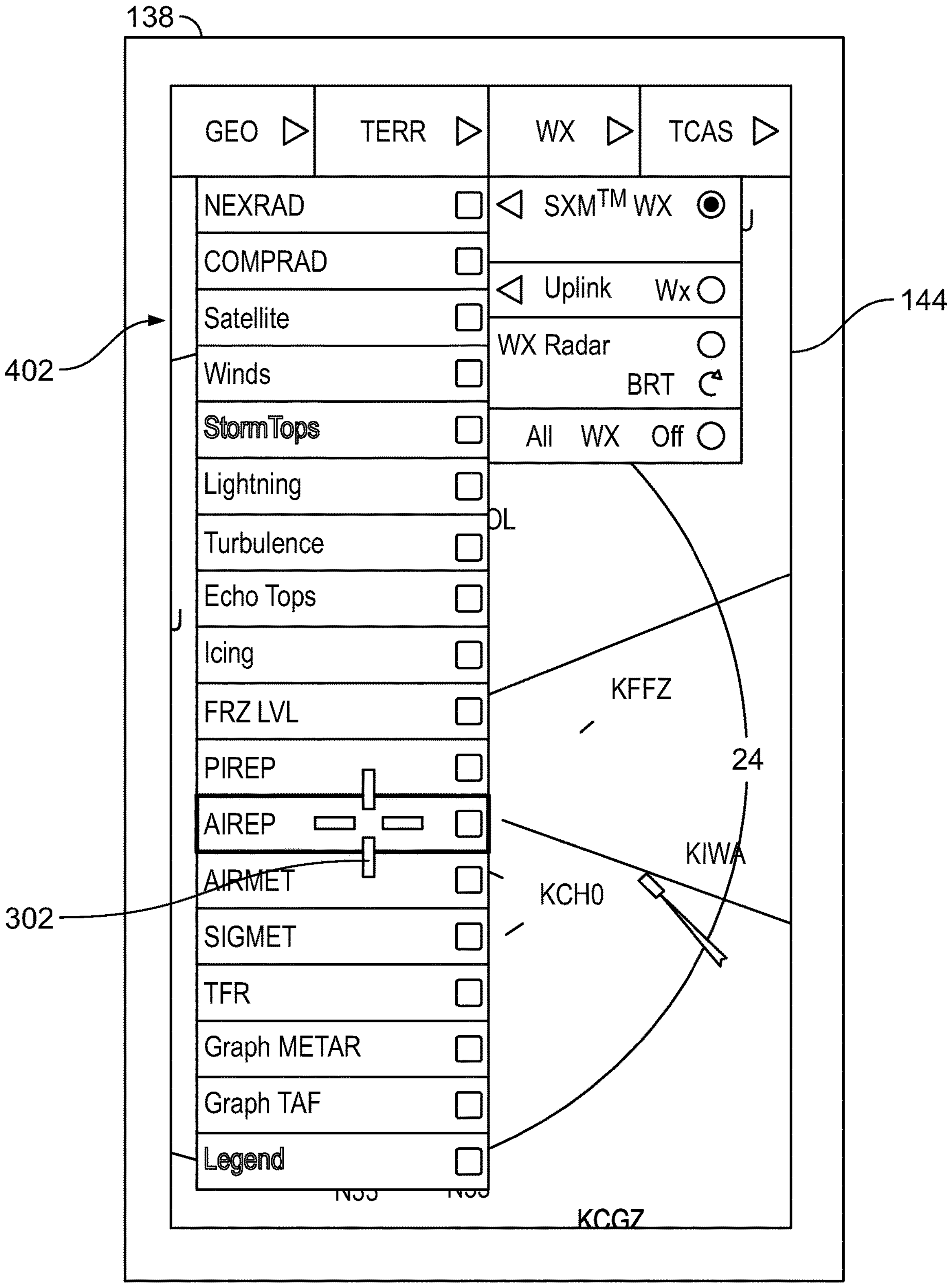
Figure 5:
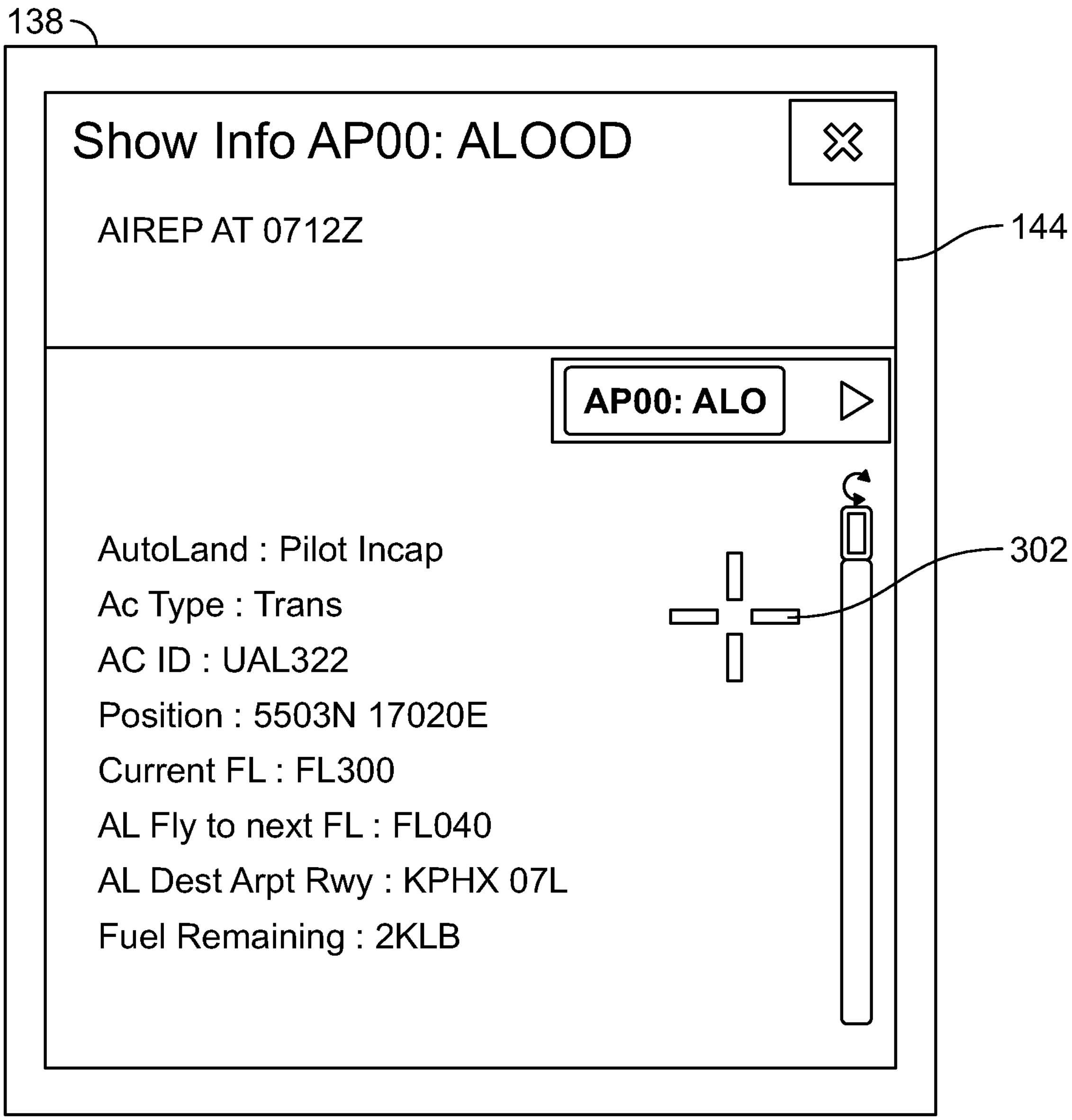

Turning now to FIG. 3, it is seen that the second processing system 136 is further configured, in response to a rendered cursor 302 being placed over a portion of the warning icon 202, to command the display device 138 to render textual information 304. This textual information 304, at least in the depicted embodiment, identifies the first aircraft 102 and indicates that the first aircraft 102 transmitted an AIREP-autoland message. Thereafter, as depicted in FIG. 4, the pilot in the second aircraft 132 may then select, via a suitable user interface 402 rendered on the display device 138, to view the received AIREP-autoland message. Specifically, the second processing system 136, in response to input from the pilot, commands the display device 138 to render the AIREP-autoland message details. One example of the AIREP-autoland message details that may be rendered, based on the previously described example AIREP-autoland message transmitted from the first aircraft 102, is depicted in FIG. 5.

Figure 6:
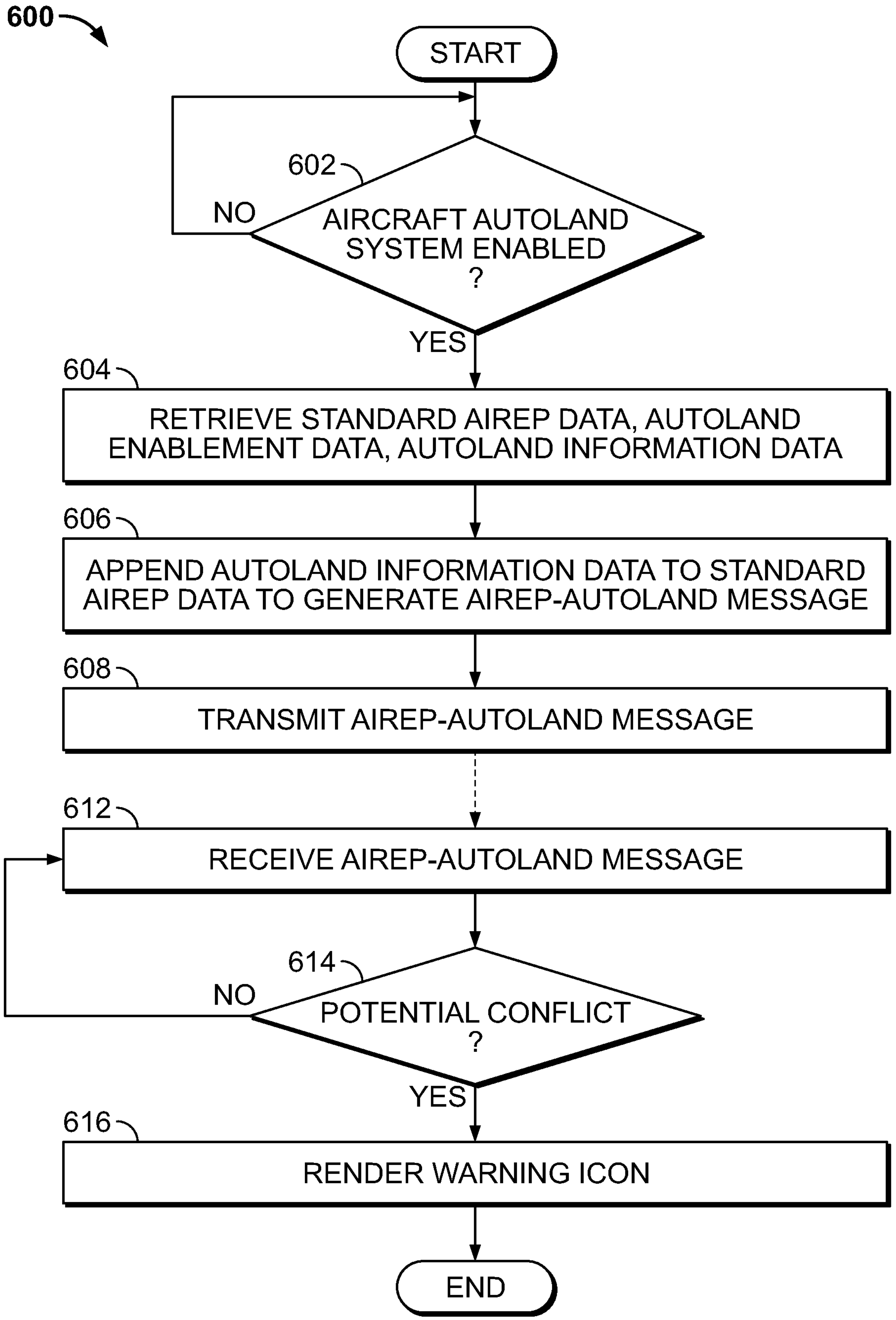
FIG. 6 depicts a method, in flowchart form, that may be implemented in the system of FIG. 1.

Having described the overall functionality of the system 100, a description of a method of transmitting an aircraft report (AIREP) that is implemented in the system 100 will be described. The method 600, which is depicted in flowchart form in FIG. 6, represents various embodiments of a method for transmitting an aircraft report (AIREP) from an autoland enabled aircraft. For illustrative purposes, the following description of method 600 may refer to elements mentioned above in connection with FIG. 1. In practice, portions of method 600 may be performed by different components of the described system 100. It should be appreciated that method 600 may include any number of additional or alternative tasks, the tasks shown in FIG. 3 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 if the intended overall functionality remains intact.

The method 600 starts and the first processing system 106 checks if the autoland system 126 is enabled (602). If not, the first processing system 106 continues this check until the autoland system 126 is enabled. When the autoland system 126 is enabled, the first processing system 106 retrieves standard AIREP data from one or more of the avionic systems 108 within the first aircraft 102, autoland enablement data that indicates whether the autoland system 126 was manually or automatically enabled, and the autoland information data from one or more of the avionics systems 108 (604). The first processing system 106 then appends the autoland information data to the standard AIREP data to generate an AIREP-autoland message (606), and then commands the transmitter 104 to transmit the AIREP-autoland message (608).

As may be appreciated, if there are no other aircraft (e.g., no “second aircraft”) within sufficient vicinity to receive the AIREP-autoland message, the method 600 would simply continue within the first aircraft 102 as described. If, however, one or more second aircraft 132 are within sufficient vicinity to receive the AIREP-autoland message then, as FIG. 6 further depicts, the receiver 134 in the second aircraft 132 receives the AIREP-autoland message transmitted by the first aircraft 102 (612), and the second processing system 136 processes the AIREP-autoland message to determine if the first aircraft 102 represents a potential conflict with the second aircraft 132 (614).

If the second processing system 136 determines that the first aircraft 102 does not represent a potential conflict with the second aircraft 132, then the previous method steps (612, 614) are repeated. However, when the second processing system 136 does determined that the first aircraft 102 represents a potential conflict with the second aircraft 132, the second processing system 136 commands the display device to render the warning icon 202 indicating that the potential conflict exists (616).

As noted above, as part of the implemented method 600, the first processing system 106 also retrieves autoland enablement data that indicates whether the autoland system 126 was manually or automatically enabled. It will be appreciated that, at least in some embodiments, if the autoland system 126 is enabled manually, then the first processing system 106 may be further configured to, at least selectively, command the transmitter 104 to transmit a PIREP-autoland message when the autoland system is enabled manually. As used herein, a PIREP-autoland message is generated by appending the autoland information data to standard PIREP data.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for transmitting an aircraft report (AIREP) from a first aircraft having an enabled aircraft autoland system, comprising:

a transmitter coupled to receive a transmit command and configured, in response to receiving the transmit command, to selectively transmit one or more messages; and a first processing system in operable communication with the transmitter and configured to:

retrieve standard AIREP data from one or more avionic systems disposed within the first aircraft, the standard AIREP data including standard AIREP reporting information, retrieve autoland enablement data that indicates whether the autoland system was manually or automatically enabled, retrieve autoland information data from the one or more avionics systems, the autoland information data including current aircraft state data and current flight plan data, the autoland information data being different from the standard AIREP data and comprising one or more of a destination runway, an estimated time of arrival to the destination runway, fuel level, and aircraft health status, append the autoland information data to the standard AIREP data to generate an AIREP-autoland message, supply the AIREP-autoland message to the transmitter, and command the transmitter to transmit the AIREP-autoland message.

2. The system of claim 1, further comprising:

a receiver disposed within a second aircraft and configured to receive the AIREP-autoland message transmitted by the first aircraft;

a second processing system disposed within the second aircraft in operable communication with the receiver, the second processing system coupled to receive the AIREP-autoland message from the receiver and configured to:

process the AIREP-autoland message to determine if the first aircraft represents a potential conflict with the second aircraft; and when the first aircraft represents the potential conflict, command a display device to render a warning icon indicating that the potential conflict exists.

3. The system of claim 2, wherein the second processing system is further configured, in response to a rendered cursor being placed over a portion of the warning icon, to command the display device to render textual information identifying the first aircraft.

4. The system of claim 2, wherein the second processing system is further configured, in response to input from a user in the second aircraft, to command the display device to render the AIREP-autoland message transmitted by the first aircraft.

5. The system of claim 1, wherein the first processing system is further configured to:

continuously retrieve the autoland information data from the one or more avionics systems;

determine if the autoland information data has changed; and when it is determined that the autoland information data has changed:

append the changed autoland data to the standard AIREP data to generate an updated AIREP-autoland message;

supply the updated AIREP-autoland message to the transmitter; and command the transmitter to transmit the updated AIREP-autoland message.

6. The system of claim 1, wherein the first processing system is further configured to command the transmitter to transmit a PIREP-autoland message when the autoland system is enabled manually.

7. A method of transmitting an aircraft report (AIREP) from a first aircraft having an enabled aircraft autoland system, the method comprising the steps of:

retrieving, via a first processing system, standard AIREP data from one or more avionic systems within the first aircraft, the standard AIREP data including standard AIREP reporting information;

retrieving, via the first processing system, autoland enablement data that indicates whether the autoland system was manually or automatically enabled;

retrieving, via the first processing system, autoland information data from the one or more avionics systems, the autoland information data including current aircraft state data and current flight plan data, the autoland information data being different from the standard AIREP data and comprising one or more of a destination runway, an estimated time of arrival to the destination runway, fuel level, and aircraft health status;

appending, via the first processing system, the autoland information data to the standard AIREP data to generate an AIREP-autoland message; and transmitting, via a transmitter onboard the first aircraft, the AIREP-autoland message.

8. The method of claim 7, further comprising:

in a second aircraft:

receiving, via an onboard receiver, the AIREP-autoland message transmitted by the first aircraft;

processing, in a second processing system, the AIREP-autoland message to determine if the first aircraft represents a potential conflict with the second aircraft; and when the first aircraft represents the potential conflict, commanding a display device, using the second processing system, to render a warning icon indicating that the potential conflict exists.

9. The method of claim 8, further comprising:

in response to a rendered cursor being placed over a portion of the warning icon, commanding the display device, using the second processing system, to render textual information identifying the first aircraft.

10. The method of claim 9, further comprising:

in response to input from a user in the second aircraft, commanding the display device, using the second processing system, to render the AIREP-autoland message transmitted by the first aircraft.

11. The method of claim 7, further comprising:

continuously retrieving, via the first processing system, the autoland information data from the one or more avionics systems;

determining, in the first processing system, if the autoland information data has changed; and when it is determined that the autoland information data has changed:

appending, via the first processing system, the changed autoland data to the standard AIREP data to generate an updated AIREP-autoland message; and transmitting, via the transmitter onboard the first aircraft, the updated AIREP-autoland message.

12. The method of claim 7, further comprising:

transmitting, via the transmitter onboard the first aircraft, a PIREP-autoland message when the autoland system is enabled manually.

13. A system for communicating an aircraft report (AIREP) from a first aircraft having an enabled aircraft autoland system to a second aircraft, comprising:

a transmitter disposed within the first aircraft and coupled to receive a transmit command, the transmitter configured, in response to receiving the transmit command, to selectively transmit one or more messages;

a first processing system disposed within the first aircraft, the first processing system in operable communication with the transmitter and configured to:

retrieve standard AIREP data from one or more avionic systems disposed within the first aircraft, the standard AIREP data including standard AIREP reporting information, retrieve autoland enablement data that indicates whether the autoland system was manually or automatically enabled, retrieve autoland information data from the one or more avionics systems, the autoland information data including current aircraft state data and current flight plan data, the autoland information data being different from the standard AIREP data and comprising one or more of a destination runway, an estimated time of arrival to the destination runway, fuel level, and aircraft health status, append the autoland information data to the standard AIREP data to generate an AIREP-autoland message, supply the AIREP-autoland message to the transmitter, and command the transmitter to transmit the AIREP-autoland message;

a receiver disposed within the second aircraft and configured to receive the AIREP-autoland message transmitted by the first aircraft;

a second processing system disposed within the second aircraft and in operable communication with the receiver, the second processing system coupled to receive the AIREP-autoland message from the receiver and configured to:

process the AIREP-autoland message to determine if the first aircraft represents a potential conflict with the second aircraft, and when the first aircraft represents the potential conflict, command a display device to render a warning icon indicating that the potential conflict exists.

14. The system of claim 13, wherein the second processing system is further configured, in response to a rendered cursor being placed over a portion of the warning icon, to command the display device to render textual information identifying the first aircraft.

15. The system of claim 13, wherein the second processing system is further configured, in response to input from a user in the second aircraft, to command the display device to render the AIREP-autoland message transmitted by the first aircraft.

16. The system of claim 13, wherein the first processing system is further configured to:

continuously retrieve the autoland information data from the one or more avionics systems;

determine if the autoland information data has changed; and when it is determined that the autoland information data has changed:

append the changed autoland information data to the standard AIREP data to generate an updated AIREP-autoland message;

supply the updated AIREP-autoland message to the transmitter; and command the transmitter to transmit the updated AIREP-autoland message.

17. The system of claim 13, wherein the first processing system is further configured to command the transmitter to transmit a PIREP-autoland message when the autoland system is enabled manually.

* * * * *